(12) United States Patent
Jaskot et al.

(10) Patent No.: US 11,620,445 B2
(45) Date of Patent: Apr. 4, 2023

(54) SYSTEM AND METHOD FOR IMPLEMENTING AN AUTOMATIC DATA COLLECTION AND PRESENTATION GENERATOR MODULE

(71) Applicant: JPMorgan Chase Bank, N.A., New York, NY (US)

(72) Inventors: Trevor D. Jaskot, Warrenton, VA (US); Jeremy Ake, Flemington, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 277 days.

(21) Appl. No.: 17/032,375

(22) Filed: Sep. 25, 2020

(65) Prior Publication Data
US 2021/0089713 A1  Mar. 25, 2021

Related U.S. Application Data

(60) Provisional application No. 62/905,686, filed on Sep. 25, 2019.

(51) Int. Cl.
*G06F 16/25* (2019.01)
*G06F 21/62* (2013.01)
*H04L 9/40* (2022.01)
*G06F 40/186* (2020.01)

(52) U.S. Cl.
CPC .......... *G06F 40/186* (2020.01); *G06F 16/258* (2019.01); *G06F 21/6218* (2013.01); *H04L 63/08* (2013.01); *H04L 63/102* (2013.01)

(58) Field of Classification Search
CPC .... G06F 21/6218; H04L 63/08; H04L 63/102
See application file for complete search history.

(56) References Cited

U.S. PATENT DOCUMENTS

| 8,595,103 | B1 * | 11/2013 | Wargin | G06Q 10/06 705/38 |
| 9,665,911 | B2 * | 5/2017 | Humpherys | G06Q 40/08 |
| 10,009,391 | B1 * | 6/2018 | Smith | G06F 16/2477 |
| 10,412,028 | B1 * | 9/2019 | Gregg | G16H 50/30 |
| 10,460,023 | B1 * | 10/2019 | Shriver | G06F 40/117 |
| 10,635,751 | B1 * | 4/2020 | Relangi | G06N 3/0445 |

(Continued)

*Primary Examiner* — Jason Chiang
(74) *Attorney, Agent, or Firm* — Greenblum & Bernstein, P.L.C.

(57) ABSTRACT

A system and method for implementing an automatic data collection and presentation generator module are disclosed. A database stores a plurality of templates and data components. A receiver receives a request from a user to automatically generate an electronic data presentation based on a template and a limited data set selected from the data components. A processor receives user's credential information corresponding to the received request. The processor also accesses the database to identify a template among a plurality of templates based on user's access permission and verified authentication; hydrates the identified template with the limited data by applying a predefined data injection algorithm that is configured to determine that the limited data set is accessible by the user based on the user's access permission and the verified authentication; and automatically generates the electronic data presentation with the hydrated identified template having the limited data.

17 Claims, 5 Drawing Sheets

(56) References Cited

U.S. PATENT DOCUMENTS

| | | | |
|---|---|---|---|
| 11,289,200 B1* | 3/2022 | Gregg | H04L 63/105 |
| 2007/0118399 A1* | 5/2007 | Avinash | G16H 40/20 |
| | | | 705/2 |
| 2010/0275154 A1* | 10/2010 | Livnat | G06F 1/1609 |
| | | | 715/802 |
| 2010/0325103 A1* | 12/2010 | Miller | H02B 11/24 |
| | | | 707/E17.014 |
| 2011/0184935 A1* | 7/2011 | Marlin | G06Q 50/10 |
| | | | 707/719 |
| 2012/0191476 A1* | 7/2012 | Reid | G16H 10/65 |
| | | | 705/3 |
| 2014/0195387 A1* | 7/2014 | Gopinath | G06Q 30/0631 |
| | | | 705/27.1 |
| 2016/0092959 A1* | 3/2016 | Gross | G06Q 30/0625 |
| | | | 705/26.62 |
| 2017/0038829 A1* | 2/2017 | Lanier | G06T 19/006 |
| 2017/0154314 A1* | 6/2017 | Mones | G06N 20/00 |
| 2017/0315979 A1* | 11/2017 | Boucher | G06F 40/205 |
| 2018/0200142 A1* | 7/2018 | Freeman | G16H 15/00 |
| 2018/0350458 A1* | 12/2018 | Soble | G06Q 10/10 |
| 2020/0097149 A1* | 3/2020 | O'Kane | G06Q 10/107 |
| 2020/0118176 A1* | 4/2020 | Muro | G06Q 30/0242 |
| 2021/0089713 A1* | 3/2021 | Jaskot | H04L 67/306 |

* cited by examiner

SYSTEM AND METHOD FOR IMPLEMENTING AN AUTOMATIC DATA COLLECTION AND PRESENTATION GENERATOR MODULE

CROSS-REFERENCE TO RELATED APPLICATIONS

This application claims the benefit of priority from U.S. Provisional Patent Application No. 62/905,686, filed Sep. 25, 2019, which is herein incorporated by reference in its entirety.

TECHNICAL FIELD

This disclosure generally relates to automatic data collection and presentation generator, and, more particularly, to methods and apparatuses for implementing an automatic data collection and presentation generator module that combines data visualization, data collection, and presentation builder all based on a user specified template or a standardized set of templates and data.

BACKGROUND

Today's corporations, agencies, institutions, and other organizations are facing a continuing problem of handling and processing a vast amount of data in a quick and expedited manner. The vast amount of data often received on a daily basis may be now stored electronically and may need to be analyzed by a variety of persons within the organization relative to business or organizational goals. The need to determine efficiently what data may be available for analysis and how to analyze disparate data across organizational management boundaries to prepare an electronic presentation may prove to be extremely time consuming and confusing as the data being tracked increases and as organizations implement more specialized or distributed functions. Managers, executives, employees, and other personnel, each with possibly differing needs for particular content and detail, may often need to analyze how different changes might affect the presentations of projects, products, resources, finances, assets, and authorized data exchange that each are responsible for. Currently, an organization invests one or more full time equivalent personnel to collect the organization's data and create presentations based on the data.

SUMMARY

The present disclosure, through one or more of its various aspects, embodiments, and/or specific features or sub-components, provides, among other features, various systems, servers, devices, methods, media, programs, and platforms for implementing an automatic data collection and presentation generator module that combines data visualization, data collection, and presentation builder all based on a user specified template or a standardized set of templates and data that allows automatic generation of electronic presentations that efficiently displays limited set of data thereby improving computer functionalities of a graphical user interface (GUI), significantly reducing utilization of computer resources, and reducing utilization of memory spaces thereby maintaining optimum memory spaces for other computer processing algorithms, but the disclosure is not limited thereto.

According to an aspect of the present disclosure, a method for implementing an automatic data collection and presentation generator module for automatically generating an electronic data presentation by utilizing one or more processors and one or more memories is disclosed. The method may include: providing a database that stores a plurality of templates and data components; receiving a request from a user to automatically generate an electronic data presentation based on a template and a limited data set selected from the data components, the template having a specified format corresponding to a user's preference or a predefined standard format, and a data size of the limited data set being smaller than a data size of the data components; receiving user's credential information corresponding to the received request; verifying authentication of the user based on the received user's credential information; accessing the database to identify a template among the plurality of templates that corresponds to the specified format requested by the user or the predefined standard format based on user's access permission and the verified authentication; hydrating the identified template with the limited data by applying a predefined data injection algorithm that may be configured to determine that the limited data set is accessible by the user based on the user's access permission and the verified authentication; automatically generating the electronic data presentation with the hydrated identified template having the limited data; and displaying the generated electronic data presentation onto a graphical user interface (GUI).

According to a further aspect of the present disclosure, the template may be generated based on one or more of the following programming languages: Python. Hypertext Markup Language (HTML), Extensible Markup Language (XML), Cascading Style Sheet (CSS), JavaScript, Flask, Jinja, C. and YAML, but the disclosure is not limited thereto.

According to another aspect of the present disclosure, the electronic data presentation may be a power point slide presentation.

According to yet another aspect of the present disclosure, the electronic data presentation may be generated by utilizing an application suite from which data creation and data visualization set of charts may create an auto-generated language schema which may be used in any one of the following presentation file extensions: .pdf, .xml, .vsdx, and .pptx, but the disclosure is not limited thereto.

According to an additional aspect of the present disclosure, the template may be generated as static template depending on the user's preference and a determination of which line of business of an organization the user belongs to.

According to a further aspect of the present disclosure, the electronic data presentation may be generated by utilizing an application suite that may be configured to export a final version of the electronic data presentation with a user specified template or as a predefined standard template for each respective line of business.

According to yet another aspect of the present disclosure, the database may be an adaptive data storage and hydrating the identified template may further include: calling the requested template from the adaptive data storage; identifying whether the requested template includes user specified format that are currently not available among the plurality of formats; machine learning the user specified format by utilizing a virtual machine; correlating the user specified format to a particular user who requested the template; and storing the user specified format onto the adaptive data storage so that when the same user requests a template again, the virtual machine can automatically generate a hydrated template that corresponds to the user specified format.

According to another aspect of the present disclosure, a system for implementing an automatic data collection and presentation generator module for automatically generating an electronic data presentation is disclosed. The system may include: a repository that stores a plurality of templates and data components; a receiver that receives a request from a user to automatically generate an electronic data presentation based on a template and a limited data set selected from the data components, the template having a specified format corresponding to a user's preference or a predefined standard format, and a data size of the limited data set being smaller than a data size of the data components; and a processor coupled to the database and the receiver via a communication network, wherein the processor may be configured to: receive user's credential information corresponding to the received request; verify authentication of the user based on the received user's credential information; access the database to identify a template among a plurality of templates that corresponds to the specified format requested by the user or the predefined standard format based on user's access permission and the verified authentication; hydrate the identified template with the limited data by applying a predefined data injection algorithm that is configured to determine that the limited data set is accessible by the user based on the user's access permission and the verified authentication; automatically generate the electronic data presentation with the hydrated identified template having the limited data; and display the generated electronic data presentation onto a graphical user interface (GUI).

According to a further aspect of the present disclosure, the processor may generate the template based on one or more of the following programming languages: Python, Hypertext Markup Language (HTML), Extensible Markup Language (XML), Cascading Style Sheet (CSS), JavaScript, Flask, Jinja, C, and YAML, but the disclosure is not limited thereto.

According to yet another aspect of the present disclosure, the processor may generate the electronic data presentation by utilizing an application suite from which data creation and data visualization set of charts may create an auto-generated language schema which may be used in any one of the following presentation file extensions: .pdf, .xml, .vsdx and .pptx, but the disclosure is not limited thereto.

According to an additional aspect of the present disclosure, the processor may generate the template as static template depending on the user's preference and a determination of which line of business of an organization the user belongs to.

According to a further aspect of the present disclosure, the processor may generate the electronic data presentation by utilizing an application suite that may be configured to export a final version of the electronic data presentation with a user specified template or as a predefined standard template for each respective line of business.

According to yet another aspect of the present disclosure, the database may be an adaptive data storage and wherein, in order to hydrate the identified template, the processor is configured to: call the requested template from the adaptive data storage; identify whether the requested template includes user specified format that are currently not available among the plurality of formats; machine learn the user specified formats by utilizing a virtual machine; correlate the user specified format to a particular user who requested the template; and store the user specified format onto the adaptive data storage so that when the same user requests a template again, the virtual machine can automatically generate a hydrated template that corresponds to the user specified format.

According to yet another aspect of the present disclosure, a non-transitory computer readable medium configured to store instructions for implementing an automatic data collection and presentation generator module for automatically generating an electronic data presentation is disclosed. The instructions, when executed, may cause a processor to perform the following: providing a database that stores a plurality of templates and data components, receiving a request from a user to automatically generate an electronic data presentation based on a template and a limited data set selected from the data components, the template having a specified format corresponding to a user's preference or a predefined standard format, and a data size of the limited data set being smaller than a data size of the data components, receiving user's credential information corresponding to the received request; verifying authentication of the user based on the received user's credential information; accessing the database to identify a template among a plurality of templates that corresponds to the specified format requested by the user or the predefined standard format based on the user's access permission and the verified authentication; hydrating the identified template with the limited data by applying a predefined data injection algorithm that is configured to determine that the limited data set is accessible by the user based on the user's access permission and the verified authentication; automatically generating the electronic data presentation with the hydrated identified template having the limited data; and displaying the generated electronic data presentation onto a graphical user interface (GUI).

According to an additional aspect of the present disclosure, the instructions, when executed, may cause the processor to generate the template based on one or more of the following programming languages: Python, Hypertext Markup Language (HTML), Extensible Markup Language (XML), Cascading Style Sheet (CSS), JavaScript, Flask. Jinja, C, and YAML, but the disclosure is not limited thereto.

According to yet another aspect of the present disclosure, wherein the database may be an adaptive data storage and wherein, in order to hydrate the identified template, the instructions, when executed, may cause the processor to: call the requested template from the adaptive data storage; identify whether the requested template includes user specified format that are currently not available among the plurality of formats; machine learn the user specified formats by utilizing a virtual machine; correlate the user specified format to a particular user who requested the template; and store the user specified format onto the adaptive data storage so that when the same user requests a template again, the virtual machine can automatically generate a hydrated template that corresponds to the user specified format.

According to a further aspect of the present disclosure, wherein the instructions, when executed, may cause the processor to generate the electronic data presentation by utilizing an application suite from which data creation and data visualization set of charts create an auto-generated language schema which is used in any one of the following presentation file extensions: .pdf, .xml, .vsdx, and .pptx, but the disclosure is not limited thereto.

According to another aspect of the present disclosure, wherein the instructions, when executed, may cause the processor to generate the template as static template depending on the user's preference and a determination of which line of business of an organization the user belongs to.

According to yet another aspect of the present disclosure, wherein the instructions, when executed, may cause the processor to generate the electronic data presentation by utilizing an application suite that is configured to export a final version of the electronic data presentation with a user specified template or as a predefined standard template for each respective line of business.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
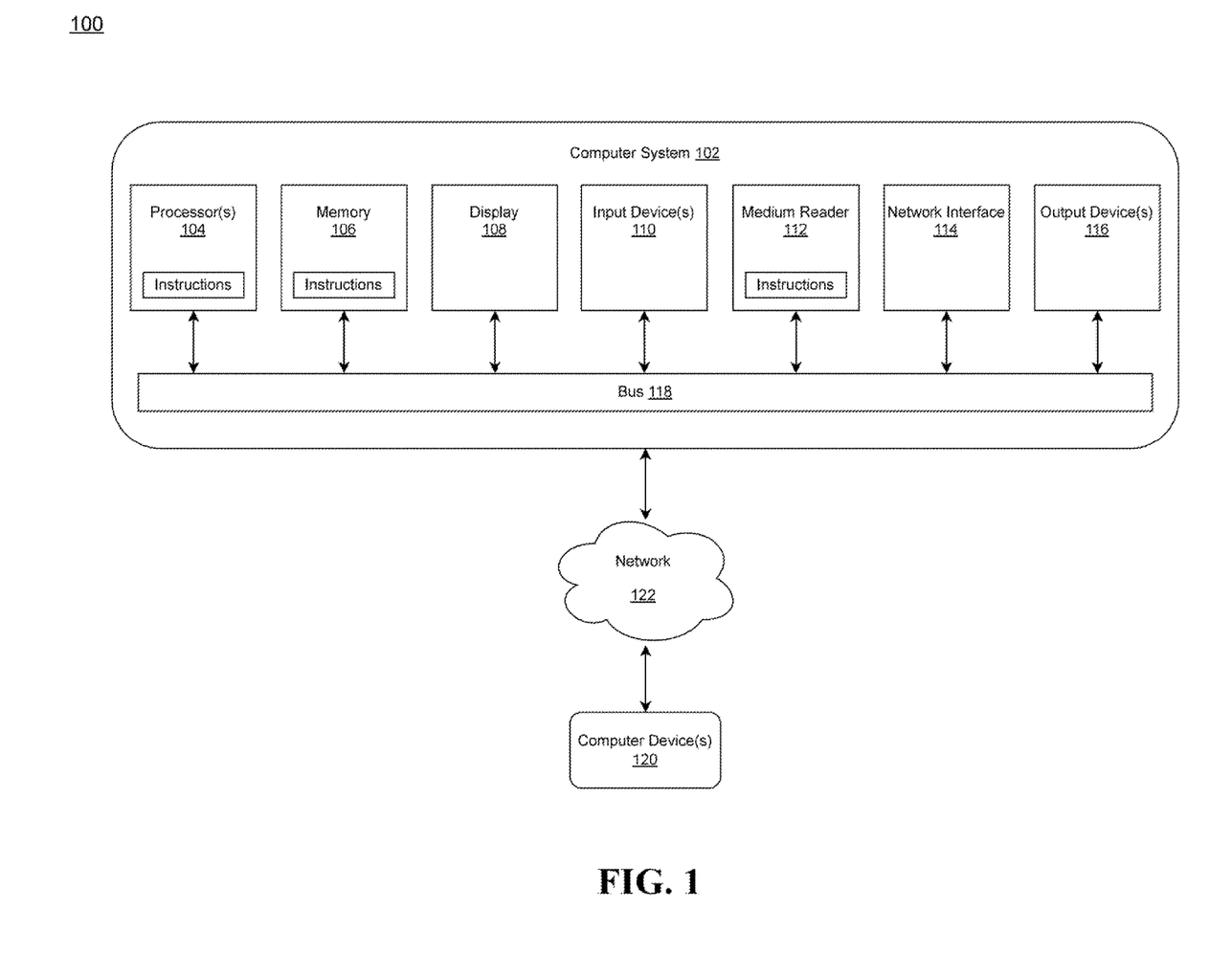
FIG. 1 illustrates a computer system for implementing an automatic data collection and presentation generator module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor

104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
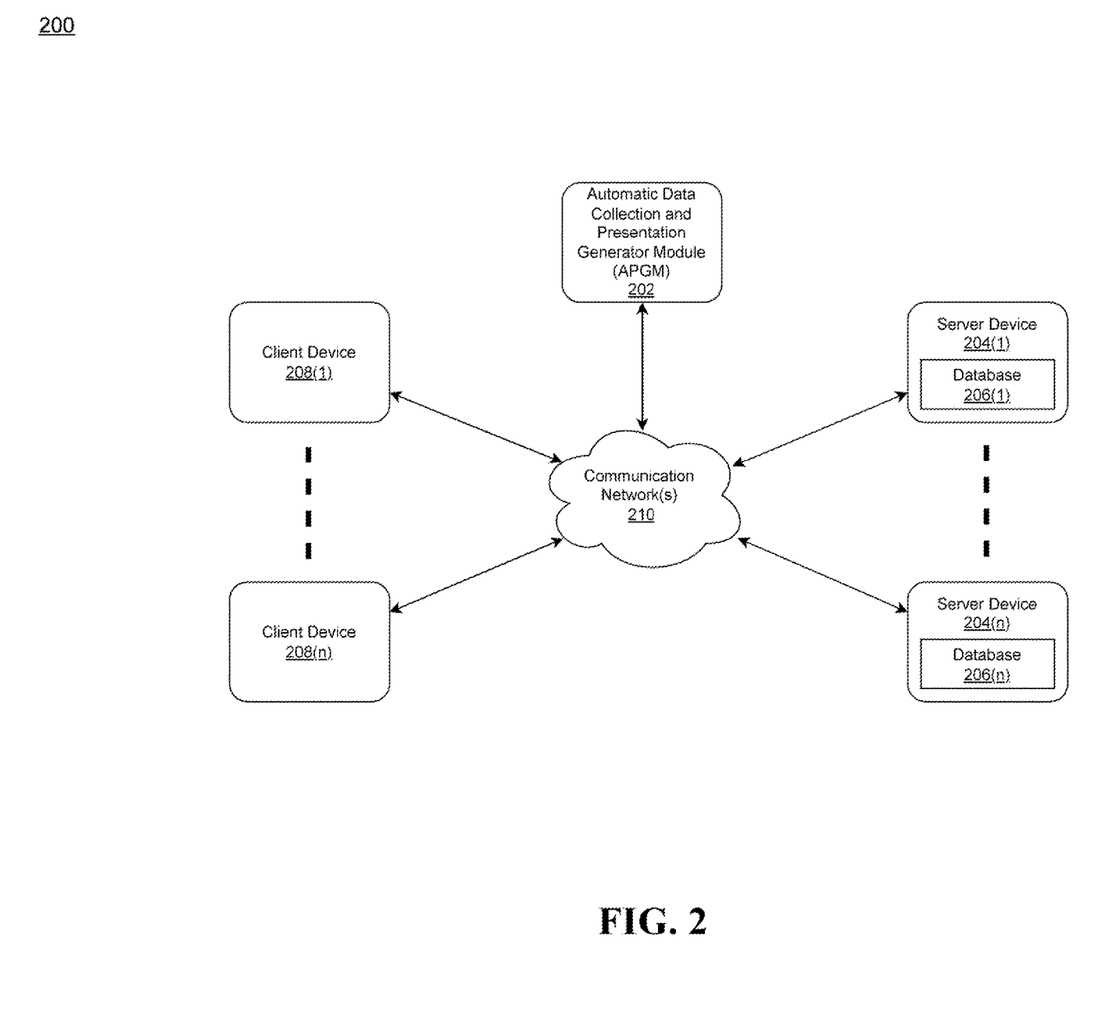
FIG. 2 illustrates an exemplary diagram of a network environment with an automatic data collection and presentation generator module in accordance with an exemplary embodiment.

Referring to FIG. 2, a schematic of an exemplary network environment 200 for implementing an automatic data collection and presentation generator module (APGM) of the instant disclosure is illustrated.

Conventional system, that does not implement an APGM of the instant disclosure, may not be able to automatically collect limited set of data from data components and further may not be able to automatically generate an electronic presentation with the limited set of data, thereby significantly increasing time of generation of electronic presentation for a user in a line of business, leading to wasting computer resources and a significant delay in meeting a user's business or organizational goals.

According to exemplary embodiments, the above-described problems associated with conventional approach of generating presentations may be overcome by implementing an APGM 202 as illustrated in FIG. 2 that may provide a platform for implementing the APGM 202 which may to automatically collect limited set of data from a data components, and further may automatically generate an electronic presentation with the limited set of data, thereby significantly reducing time of generation of electronic presentation for a user in a line of business.

For example, the various aspects, embodiments, and/or specific features or sub-components of the instant disclosure, provide, among other features, various systems, servers, devices, methods, media, programs, and platforms for implementing an automatic and user privileged based authorized data collection and presentation generator module that combines data visualization, data collection, and presentation builder all based on a user specified template or a standardized set of templates and data that allows automatic generation of electronic presentations that efficiently displays limited set of data thereby improving computer functionalities of a graphical user interface (GUI), significantly reducing utilization of computer resources, and reducing utilization of memory spaces thereby maintaining optimum memory spaces for other computer processing algorithms, but the disclosure is not limited thereto.

The APGM 202 may be the same or similar to the computer system 102 as described with respect to FIG. 1.

The APGM 202 may store one or more applications that can include executable instructions that, when executed by the APGM 202, cause the APGM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the APGM 202 itself, may be located in virtual server(s) running in a cloud-based computing environment rather than being tied to one or more specific physical network computing devices. Also, the application(s) may be running in one or more virtual machines (VMs) executing on the APGM 202. Additionally, in one or more embodiments of this technology, virtual machine(s) running on the APGM 202 may be managed or supervised by a hypervisor.

In the network environment 200 of FIG. 2, the APGM 202 is coupled to a plurality of server devices 204(1)-204(n) that hosts a plurality of databases 206(1)-206(n) including adaptive data storages, and also to a plurality of client devices 208(1)-208(n) via communication network(s) 210. A communication interface of the APGM 202, such as the network interface 114 of the computer system 102 of FIG. 1, operatively couples and communicates between the APGM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the APGM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The APGM 202 may be a standalone device or integrated with one or more other devices or apparatuses, such as one or more of the server devices 204(1)-204(n), for example. In one particular example, the APGM 202 may be hosted by one of the server devices 204(1)-204(n), and other arrangements are also possible. Moreover, one or more of the devices of the APGM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the APGM 202 via the communication network(s) 210 according to the HTTP-based, HTTPS-based, and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the APGM 202 that may efficiently provide a platform for implementing the APGM 202 which may be configured to diagnose software failures much faster than conventional approach, independently test only the created new URL for running the application without testing all URLs and their underlying components, reutilizing the components from other parts of the application or from different application without re-architecting the entire application to create the new URL, thereby reducing utilization of computer resources and reducing utilization of memory spaces so that sufficient numbers of memory spaces may be available for other computer processing algorithms, but the disclosure is not limited thereto.

The client devices 208(1)-208(n) may run interface applications, such as standard web browsers or standalone client applications, which may provide an interface to communicate with the APGM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the APGM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the APGM 202, the server devices 204(1)-204(n), or the client devices 208(1)-208(n), for example, may be configured to operate as virtual instances on the same physical machine. For example, one or more of the APGM 202, the server devices 204(1)-204(n), or the client devices 208(l)-208(n) may operate on the same physical device rather than as separate devices communicating through communication network(s) 210. Additionally, there may be more or fewer APGMs 202, server devices 204(1)-204(n), or client devices 208(1)-208(n) than illustrated in FIG. 2. According to exemplary embodiments, the APGM 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
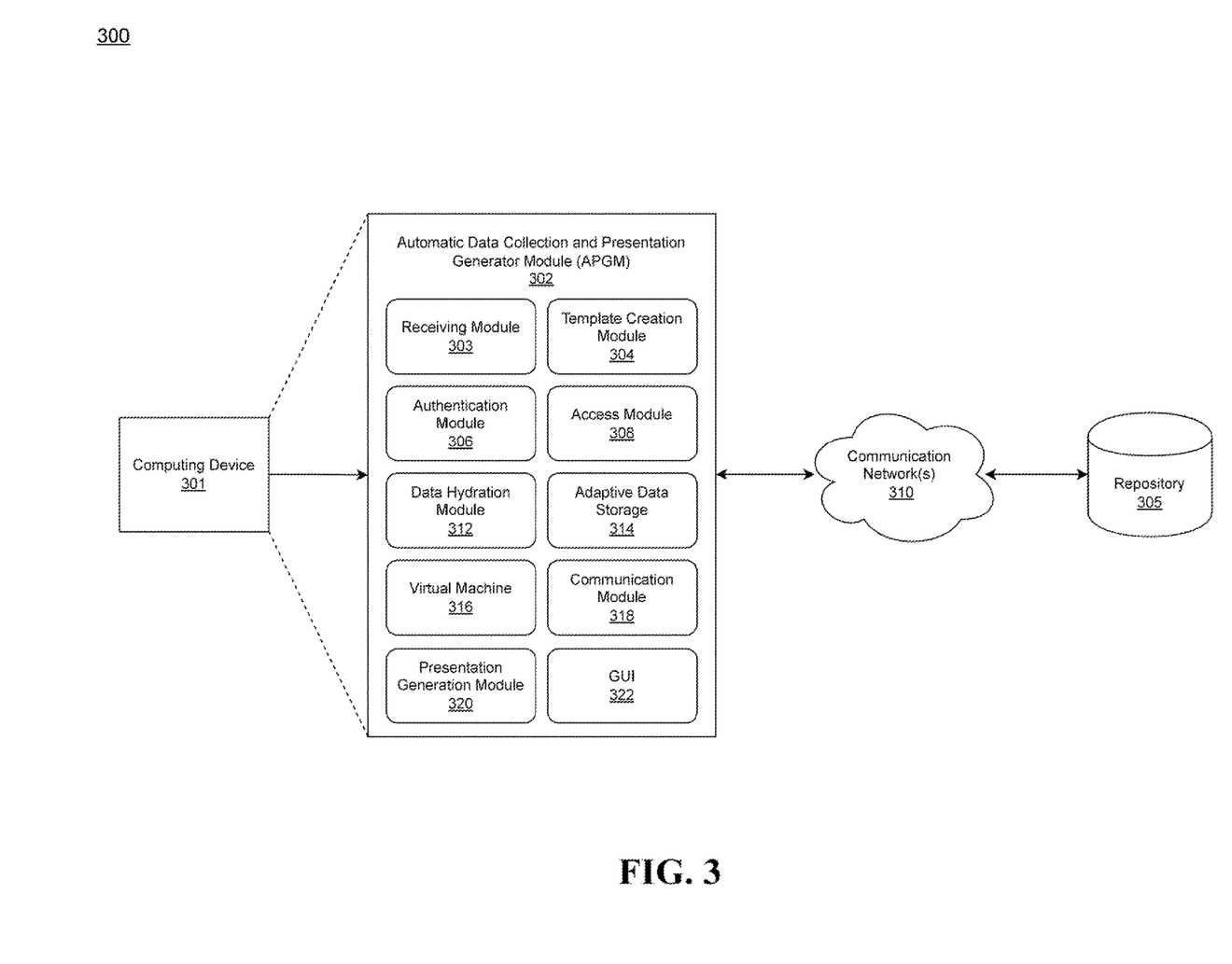
FIG. 3 illustrates a system diagram for implementing an automatic data collection and presentation generator module in accordance with an exemplary embodiment.

FIG. 3 illustrates a system diagram for implementing an automatic data collection and presentation generator module (APGM) in accordance with an exemplary embodiment. According to exemplary embodiments, a system 300 is described and shown in FIG. 3 as including an APGM 302 embedded within a computing device 301, although it may include other rules, policies, modules, databases, or applications, for example.

As will be described below, according to exemplary embodiments, the APGM 302 may be configured to automatically generate electronic presentations that efficiently displays limited set of data thereby improving computer functionalities of a graphical user interface (GUI), significantly reducing utilization of computer resources, and reducing utilization of memory spaces thereby maintaining optimum memory spaces for other computer processing algorithms performed by the computing device 301, but the disclosure is not limited thereto.

As shown in FIG. 3, an exemplary system 300 may include a computing device 301 within which the APGM 302 may be embedded, a repository (i.e., database) 305 which may store a plurality of templates and data components, and a communication network 310 via which the computing device 301, the APGM 302, and the repository 305 are interconnected to exchange data.

According to exemplary embodiments, the computing device 301 may be the same or equivalent to the computing device 208 as illustrated in FIG. 2, the repository 305 may include a memory (e.g., shown in FIG. 1) and may be the same or equivalent to the server 204 as illustrated in FIG. 2, and the communication network 310 may be the same or equivalent to the communication network 210 as illustrated in FIG. 2.

As shown in FIG. 3, the APGM 302 may include a receiving module 303, a template creation module 304, an authentication module 306, an access module 308, a data hydration module 312, an adaptive data storage 314, a virtual machine 316, a communication module 318, a presentation generation module 320, and a graphical user interface (GU) 322.

Figure 5:
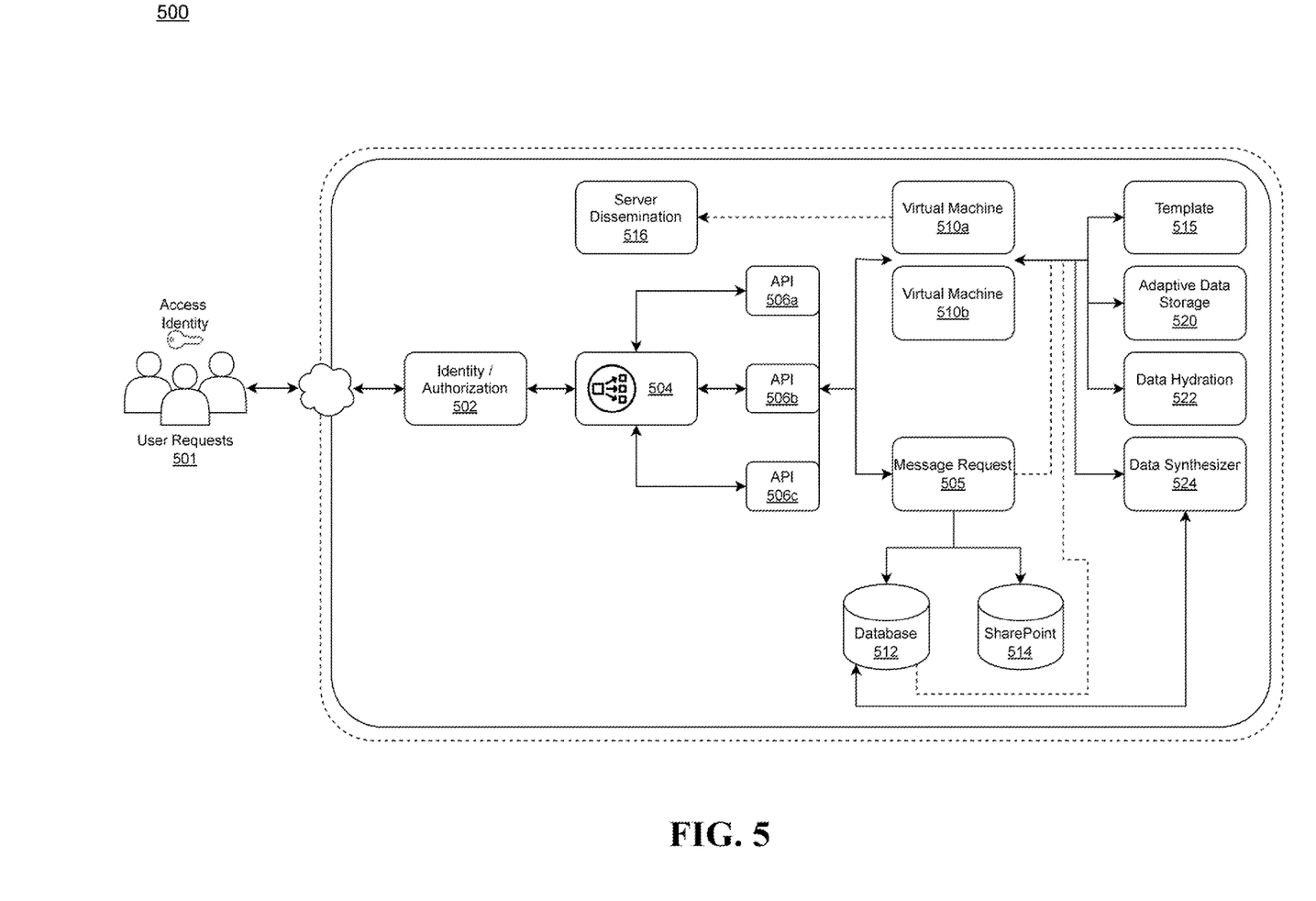
FIG. 5 illustrates an exemplary architecture diagram of an automatic data collection and presentation generator module in accordance with an exemplary embodiment.

FIG. 5 illustrates an exemplary architecture diagram 500 of an automatic data collection and presentation generator module in accordance with an exemplary embodiment. According to exemplary embodiments, the automatic data collection and presentation generator module may be the same or similar to the APGM 302 as illustrated in FIG. 3.

As shown in FIG. 5, an exemplary architecture diagram 500 may include a computing device (not shown) for receiving user requests from user 501, an identify/authorization module 502, load balancer 504, a plurality of APIs 506a, 506b, 506c, etc. (although three APIs are illustrated, the disclosure is not limited thereto), a message request module 505, a plurality of virtual machines 510a. 510b, database 512, share point module 514, a server dissemination module 516, exemplary template 515, adaptive data storage 520, data hydration module 522, and a data synthesizer module 524. Although only one template is illustrated in FIG. 5, the disclosure is not limited thereto. A plurality of templates may be generated.

Referring to FIGS. 3 and 5, the process may be executed via the communication network 310, which may comprise plural networks as described above. For example, in an exemplary embodiment, the various components of the APGM 302 may communicate with the repository 305 and database 512 via the communication module 318 and the communication network(s) 310. Of course, these embodiments are merely exemplary and are not limiting or exhaustive.

According to exemplary embodiments, each of the receiving module 303, the template creation module 304, the authentication module 306, identify/authorization module 502, the access module 308, the data hydration module 312, 522, the adaptive data storage 314, 522, the virtual machines 316, 510a, 510b, the communication module 318, the presentation generation module 320, the message request module 505, the share point module 514, the server dissemination module 516, and the data synthesizer module 524 may be implemented by microprocessors or similar, they may be programmed using software (e.g., microcode) to perform various functions discussed herein and may optionally be driven by firmware and/or software. Alternatively, each of the receiving module 303, the template creation module 304, the authentication module 306, identify/authorization module 502, the access module 308, the data hydration module 312, 522, the adaptive data storage 314, 522, the virtual machines 316, 510a. 510b, the communication module 318, the presentation generation module 320, the message request module 505, the share point module 514, the server dissemination module 516, and the data synthesizer module 524 may be implemented by dedicated hardware, or as a combination of dedicated hardware to perform some functions and a processor (e.g., one or more programmed microprocessors and associated circuitry) to perform other functions without departing from the scope of the present disclosure.

Referring to FIGS. 3 and 5 again, according to exemplary embodiments, the receiving module 303 may be configured to receive a request from a user 501 to automatically generate an electronic data presentation based on a template and a limited data set selected from the data components. According to exemplary embodiments, the template may include a specified format corresponding to a user's preference or a predefined standard format, and a data size of the limited data set being smaller than a data size of the data components.

According to exemplary embodiments, the receiving module 303 may also be configured to receive user's credential information corresponding to the received request via the identity/authorization module 502.

According to exemplary embodiments, the template creation module 304 may be configured to create templates 515 and receiving request from a user 501 from the receiving module 303 may trigger the template creation module 304 to send those created templates 515 to the adaptive data storage 314, 520. According to exemplary embodiments, the template creation module 304 may be configured to create the template 515 as static template depending on the user's preference and a determination of which line of business of an organization the user belongs to.

For example, according to exemplary embodiments, the template creation module 304 may be configured to create the template 515 on the fly and/or as static depending on what a user 501 may prefer (e.g., how many columns, tables, rows etc.). Examples of templates may include adapted and/or segmented templates based on user's request and preference and which line of business a user 501 may belong to. In addition, according to exemplary embodiments, a user 501 may specify what template he/she wants to be utilized for automatic generation of the presentations. An exemplary template is illustrated in the attached Appendix 1, and an exemplary output of the template (e.g., a final version of an electronic presentation) is illustrated in the attached Appendix 2 submitted in U.S. Provisional Patent Application No. 62/905,686, filed Sep. 25, 2019, which is herein incorporated by reference in its entirety.

According to exemplary embodiments, the templates 515 may be created based on one or more of the following programming languages: Python, Hypertext Markup Language (HTML), Extensible Markup Language (XML), Cascading Style Sheet (CSS), JavaScript, Flask, Jinja, C, and YAML, but the disclosure is not limited thereto.

According to exemplary embodiments, the authentication module 306 (or the identify/authorization module 502) may be configured to verify authentication of the user 501 based on the user's credential information received from the receiving module 303 via an application processing interface (not shown).

According to exemplary embodiments, the access module 308 may be configured to access the repository (i.e., database) 305, 512 to identify a template among a plurality of templates that corresponds to the specified format requested by the user or the predefined standard format based on user's access permission and the verified authentication.

According to exemplary embodiments, one should appreciate that the authentication module 306 (or the identify/authorization module 502) of the APGM 302 may utilize any know algorithms for access permission verification and authentication verification without departing from the scope of the instant disclosure. According to exemplary embodiments, a load balancer 504 may be utilized to balance plural load in generating the plurality of APIs 506a, 506b, 506c. Although only three APIs are illustrated in FIG. 5, the disclosure is not limited thereto. Any desired number of APIs may be generated by the APGM 302.

According to exemplary embodiments, the data hydration module 312, 522 may be configured to hydrate the identified template with the limited data by applying a predefined data injection algorithm that may be configured to determine that the limited data set is accessible by the user 501 based on the user's access permission and the verified authentication.

According to exemplary embodiments, the repository 305 (or database 512) may be an adaptive data storage and the data hydration module 312, 522 may be configured to hydrate the identified template by triggering the following algorithms: calling the requested template from the adaptive data storage 314, 520 by the access module 308; identifying whether the requested template includes user specified format(s) that are currently not available among the plurality of formats; triggering the virtual machine 316 (or 510a, 510b) to machine learn the user specified format(s); correlating the user specified format(s) to a particular user who requested the template; and storing the user specified format(s) onto the adaptive data storage 314, 520 (or alternatively to the repository 305 or database 512) so that when the same user requests a template again, the virtual machine 316 may automatically generate a template that corresponds to the user specified format(s).

According to exemplary embodiments, the presentation generation module 320 may be configured to automatically generate the electronic data presentation with the hydrated identified template having the limited data and display the generated electronic data presentation onto the GUI 322. According to exemplary embodiments, the electronic data presentation may be a power point slide presentation and the presentations slides may also be printed as hard copies.

In addition, according to exemplary embodiments, the electronic data presentation may be generated by utilizing an application suite from which data creation and data visualization set of charts may create an auto-generated language schema which may be used in any one of the following presentation file extensions: .pdf, .xml, .vsdx, and .pptx, but the disclosure is not limited thereto. Other file extensions may also be utilized without departing from the scope of the instant disclosure.

According to exemplary embodiments, the electronic data presentation may be generated by utilizing an application suite that may be configured to export a final version of the electronic data presentation with a user specified template or as a predefined standard template for each respective line of business.

According to exemplary embodiments, the APGM 302 may be designed for the purpose of collecting firm data from which PowerPoint presentations are to be generated.

Based on the LOB specific requirements, each presentation is to be exported with a data driven model and appropriated to fit the product owner specifications.

The APGM 302 has the capability to visualize data from a given source, collect data from a an officially recognized database, export files based on numeric data analytics, and generate a fully functional presentation integrated with an entire suite of metadata specific to the applications and/or users request.

Conventional tools that function without the data collection or presentation building capabilities may include: google charts, d3.js, chart.js, highcharts, etc. The data visualization aspect of the APGM 302 utilizes user input data and goes above and beyond simple visuals (as presented by the conventional tools) by putting the associating data within a full presentation suite including that of data analytics, appropriated data structures, and data enhancement.

According to exemplary embodiments, the APGM 302 may incorporate the visualization aspect of data with additional functions that generate chart and presentation information based on preferred templating per LOB. The APGM 302 may also collect data based on preferential determination; either on a scheduled iteration or through an upload functionality built into the cloud hosted application portal as disclosed herein. Further, the APGM 302 may be configured to generate full presentations (either PowerPoint or XML based schema with all corresponding data points incorporated into the export functionality).

In coordination with identity and access management, the APGM 302 (which may also be referred to as an application) will verify and validate the user requesting the data by referring to managed keys and claims associated to the application and user's identity. This identity may be constantly updated using cron mechanisms and encrypted so only the application can verify its own identity. This happens upon application start up. According to exemplary embodiments, the application may be cloud hosted, exported as either a python application or an executable, platform agnostic, and publicly available to all LOB partners. For example, the application can create its own identity on the fly. For example, similar to a use case of authentication, the application creates a unique identifier that only it knows and only it has access to. Thus, as soon as the application starts in the cloud (or any other desired platform), it then creates its own identity based on its randomly generated unique identifier and passes on to encrypt all the data across all these synthetization and adaptive storage disclosed herein. Since the application uses its own identity in the manner discussed above, if the application were to fail, the data would not be available to other users. That is, based on quantification and qualification of data the application is accessing, it creates its own unique identifier (e.g., a secret key) which is utilized as an additional layer of identification.

An exemplary URL for the cloud adoption tool may include: http://apg-gaia.apps.dev.eu-1b.gaia.jpmchase.net/. Users 501 may leverage the user interface located at the URL above, or they can use the API's calls (e.g., 506a, 506b, 506c) directly. Whether a developer or browser preferred user, according to exemplary embodiments, both interactions consume the same set of API calls.

According to exemplary embodiments, both the application and administrator users have access to update the supporting data. A user 501 may refresh the backend data using their own identity, which the application logs and tracks accordingly, or if an hour passes where a user 501 has not updated data, the application will request updates through its own identity and update the respective databases. After this occurs, the application references disseminated e-mails (e.g., by utilizing the server dissemination module 516), user requests, and database timestamps to create a hierarchical preference on presentation creation. The algorithm determines the most appropriate recipients of the data based on the reference calls and then auto-generates files in various formats based on adaptive preference by user 501 and ultimately disseminates the generated files.

According to exemplary embodiments, the APGM 302 may be configured for curl requests that may provide exemplary syntax for API use. All APIs may provide a response. The example below highlights the determination whether each individual API provides the user 501 with Get and/or Post requests.

Based on user preference of API calls, the supported headers can be retrieved from one of the below APIs. For additional support, one can contribute or make a request to the support and engineering team. One can use either the contribution API or directly through the browser.

According to exemplary embodiments, only one e-mail per request can be sent, but the disclosure is not limited thereto. If multiple recipients are needed, an E-mail Distribution list may be created.

An example pseudo code is represented below:

```
- Support and Engineering team Requests Headers
  - Get - Supported Headers Curl:
    - curl -k https://<app-name>.apps.dev.eu-1b.gaia.jpmchase.net/supportedheaders
```

```
- Get - Request Header Type Curl:
    - curl -k https://<app-name>.apps.dev.eu-1b.gaia.jpmchase.net/requestheaders
- Mock AWS (amazon web services) Service Listing
    - Post: curl -k -X POST -H 'Content-Type: application/json' https://<app-
name>.apps.dev.eu-1b.gaia.jpmchase.net/getAWSServiceListing
    - Get: curl -k https://<app-name>.apps.dev.eu-
1b.gaia.jpmchase.net/getAWSServiceListing
```

Another example pseudo code is represented below:

```
requests.post(
    "https://<app-name>.apps.dev.eu-1b.gaia.jpmchase.net/generate",
    headers = {
        'Accept': 'application/json',
        'Content-Type': 'application/json',
        'Authorization': DynamicIdentity,
        'cache-control': "no-cache"
    }
)
```

According to exemplary embodiments, if an endpoint has additional parameters and none are supplied, the standard response may be based on user access.

For data sources via API, according to exemplary embodiments, although daily updates of all data sources may occur at a predetermined time, based on data requests, the APGM 302 (i.e., the application) may continually update the hierarchical determination of data.

For vendor dependencies, according to exemplary embodiments, the APGM 302 (i.e., the application) may be configured to store all package dependencies in a vendor folder for pip, python, and flask, but the disclosure is not limited thereto.

According to exemplary embodiments, the computing device 301 may include a memory (e.g., a memory 106 as illustrated in FIG. 1) which may be a non-transitory computer readable medium that may be configured to store instructions for implementing APGM 302 for automatically generating a final version of an electronic data presentation. The computing device 301 may also include a medium reader (e.g., a medium reader 112 as illustrated in FIG. 1) which may be configured to read any one or more sets of instructions, e.g., software, from any of the memories described herein. The instructions, when executed by a processor embedded within the APGM 302 or within the computing device 301, may be used to perform one or more of the methods and processes as described herein. In a particular embodiment, the instructions may reside completely, or at least partially, within the memory 106, the medium reader 112, and/or the processor 110 (see FIG. 1) during execution by the computing device 301.

For example, the instructions, when executed, may cause the processor 110 to perform the following: providing a database that stores a plurality of templates and data components; receiving a request from a user to automatically generate an electronic data presentation based on a template and a limited data set selected from the data components, the template having a specified format corresponding to a user's preference or a predefined standard format, and a data size of the limited data set being smaller than a data size of the data components; receiving user's credential information corresponding to the received request; verifying authentication of the user based on the received user's credential information; accessing the database to identify a template among a plurality of templates that corresponds to the specified format requested by the user or the predefined standard format based on the user's access permission and the verified authentication; hydrating the identified template with the limited data by applying a predefined data injection algorithm that is configured to determine that the limited data set is accessible by the user based on the user's access permission and the verified authentication; automatically generating the electronic data presentation with the hydrated identified template having the limited data; and displaying the generated electronic data presentation onto a graphical user interface (GUI).

Figure 4:
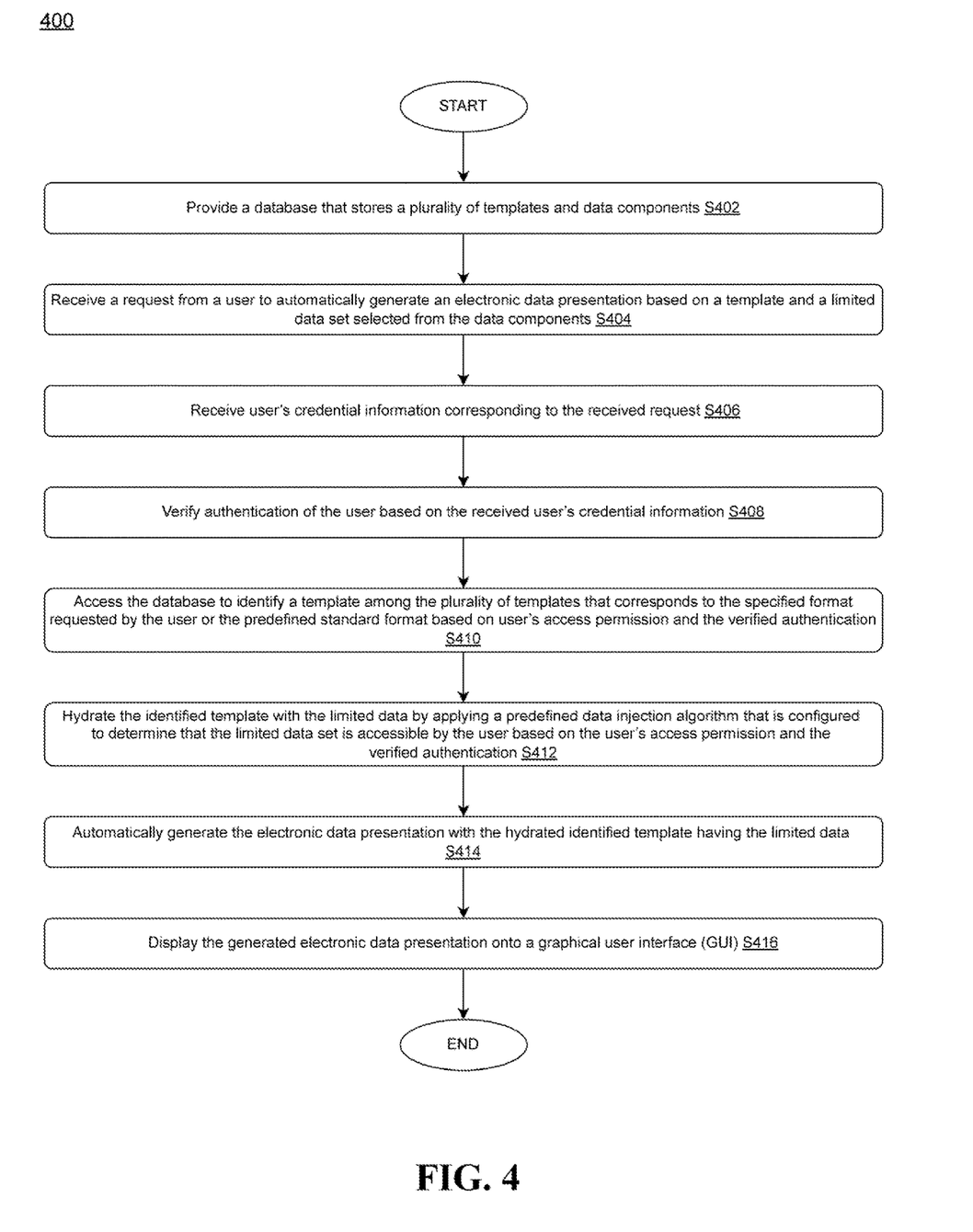
FIG. 4 illustrates a flow chart of a process for implementing an automatic data collection and presentation generator module in accordance with an exemplary embodiment.

FIG. 4 illustrates a flow chart of a process 400 for implementing an automatic data collection and presentation generator module for automatically generating an electronic data presentation by utilizing one or more processors and one or more memories in accordance with an exemplary embodiment. The automatic data collection and presentation generator module may be the APGM 302 as illustrated in FIG. 3.

At step S402, a database may be provided. According to exemplary embodiments, the database may be the same or similar to the repository 305 as illustrated in FIG. 3. The database may be configured to store a plurality of templates and data components.

At step S404, a request for automatically generating an electronic data presentation based on a template and a limited data set selected from the data components, may be received by a receiving module. According to exemplary embodiments, the receiving module may be the same or similar to the receiving module 303 as illustrated in FIG. 3. According to exemplary embodiments, the template may include a specified format corresponding to a user's preference or a predefined standard format, and a data size of the limited data set being smaller than a data size of the data components.

At step S406, the receiving module may receive user's credential information corresponding to the received request.

At step S408, authentication of the user may be verified based on the received user's credential information.

At step S410, the database may be accessed to identify a template among a plurality of templates that corresponds to the specified format requested by the user or the predefined standard format based on the user's access permission and the verified authentication.

At step S412, the identified template may be hydrated with the limited data by applying a predefined data injection algorithm that may be configured to determine that the limited data set may be accessible by the user based on the user's access permission and the verified authentication. Data hydration may be performed by a data hydration module. According to exemplary embodiments, the data hydration module may be the same or similar to the data hydration module 312 as illustrated with reference to FIG. 3 above.

At step S414, the electronic data presentation may be automatically generated with the hydrated identified template having the limited data.

At step S416, the generated electronic data presentation may be displayed onto a graphical user interface (GUI).

According to exemplary embodiments, the step S412 of data hydration may further trigger the following processes: calling the requested template from the adaptive data storage; identifying whether the requested template includes user specified format(s) that are currently not available among the plurality of formats; machine learning the user specified format(s) by utilizing a virtual machine; correlating the user specified format(s) to a particular user who requested the template; and storing the user specified format(s) onto the adaptive data storage so that when the same user requests a template again, the virtual machine can automatically generate a hydrated template that corresponds to the user specified format(s).

According to exemplary embodiments, the process 400 may further include: generating the electronic data presentation by utilizing an application suite from which data creation and data visualization set of charts create an auto-generated language schema which is used in any one of the following presentation file extensions: .pdf, .xml, .vsdx, and .pptx, but the disclosure is not limited thereto.

According to exemplary embodiments, the process 400 may further include: generating the template as static template depending on the user's preference and a determination of which line of business of an organization the user belongs to.

According to exemplary embodiments, the process 400 may further include: generating the electronic data presentation by utilizing an application suite that is configured to export a final version of the electronic data presentation with a user specified template or as a predefined standard template for each respective line of business.

According to exemplary embodiments, the computing device 301 may include a memory (e.g., a memory 106 as illustrated in FIG. 1) which may be a non-transitory computer readable medium that may be configured to store instructions for implementing APGM 302 for automatically generating a final version of an electronic data presentation. The computing device 301 may also include a medium reader (e.g., a medium reader 112 as illustrated in FIG. 1) which may be configured to read any one or more sets of instructions, e.g., software, from any of the memories described herein. The instructions, when executed by a processor embedded within the APGM 302 or within the computing device 301, may be used to perform one or more of the methods and processes as described herein. In a particular embodiment, the instructions may reside completely, or at least partially, within the memory 106, the medium reader 112, and/or the processor 110 (see FIG. 1) during execution by the computing device 301.

For example, the instructions, when executed, may cause the processor 110 to perform the following: providing a database that stores a plurality of templates and data components; receiving a request from a user to automatically generate an electronic data presentation based on a template and a limited data set selected from the data components, the template having a specified format corresponding to a user's preference or a predefined standard format, and a data size of the limited data set being smaller than a data size of the data components; receiving user's credential information corresponding to the received request; verifying authentication of the user based on the received user's credential information; accessing the database to identify a template among a plurality of templates that corresponds to the specified format requested by the user or the predefined standard format based on the user's access permission and the verified authentication; hydrating the identified template with the limited data by applying a predefined data injection algorithm that is configured to determine that the limited data set is accessible by the user based on the user's access permission and the verified authentication; automatically generating the electronic data presentation with the hydrated identified template having the limited data; and displaying the generated electronic data presentation onto a graphical user interface (GUI).

According to exemplary embodiments, the instructions, when executed, may cause the processor 110 to generate the template based on one or more of the following programming languages: Python, Hypertext Markup Language (HTML), Extensible Markup Language (XML), Cascading Style Sheet (CSS), JavaScript, Flask. Jinja, C, and YAML, but the disclosure is not limited thereto.

According to exemplary embodiments, wherein the database may be an adaptive data storage and wherein, in order to hydrate the identified template, the instructions, when executed, may cause the processor 110 to: call the requested template from the adaptive data storage; identify whether the requested template includes user specified format that are currently not available among the plurality of formats; machine learn the user specified formats by utilizing a virtual machine; correlate the user specified format to a particular user who requested the template; and store the user specified format onto the adaptive data storage so that when the same user requests a template again, the virtual machine can automatically generate a hydrated template that corresponds to the user specified format.

According to exemplary embodiments, wherein the instructions, when executed, may cause the processor 110 to generate the electronic data presentation by utilizing an application suite from which data creation and data visualization set of charts create an auto-generated language schema which is used in any one of the following presentation file extensions: .pdf, .xml, .vsdx, and .pptx, but the disclosure is not limited thereto.

According to exemplary embodiments, wherein the instructions, when executed, may cause the processor 110 to generate the template as static template depending on the user's preference and a determination of which line of business of an organization the user belongs to.

According to exemplary embodiments, wherein the instructions, when executed, may cause the processor 110 to generate the electronic data presentation by utilizing an application suite that is configured to export a final version of the electronic data presentation with a user specified template or as a predefined standard template for each respective line of business.

Thus, the exemplary embodiments disclosed herein with reference to FIGS. 1-4 may provide platforms for implementing an automatic data collection and presentation generator module that combines data visualization, data collection, and presentation builder all based on a user specified template or a standardized set of templates and data that allows automatic generation of electronic presentations that efficiently displays limited set of data thereby improving computer functionalities of a graphical user interface (GUI), significantly reducing utilization of computer resources, and reducing utilization of memory spaces thereby maintaining optimum memory spaces for other computer processing algorithms, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automatic data collection and presentation generator module for automatically generating an electronic data presentation by utilizing one or nor processors and one or more memories, the method comprising:

providing a database that stores a plurality of templates and data components;

receiving a request from a user to automatically generate an electronic data presentation based on a template and a limited data set selected from the data components, the template having a specified format corresponding to a user's preference or a predefined standard format, and a data size of the limited data set being smaller than a data size of the data components;

receiving user's credential information corresponding to the received request;

verifying authentication of the user based on the received user's credential information;

accessing the database to identify a template among the plurality of templates that corresponds to the specified format requested by the user or the predefined standard format based on user's access permission and the verified authentication;

hydrating the identified template with the limited data by applying a predefined data injection algorithm that is configured to determine that the limited data set is accessible by the user based on the user's access permission and the verified authentication;

automatically generating the electronic data presentation with the hydrated identified template having the limited data; and displaying the generated electronic data presentation onto a graphical user interface (GUI), wherein the database is an adaptive data storage, and in hydrating the identified template, the following predefined data injection algorithm is applied:

calling the requested template from the adaptive data storage;

identifying whether the requested template includes user specified format that are currently not available among the plurality of formats;

triggering a virtual machine to machine learn the user specified formats;

correlating the user specified format to a particular user who requested the template; and storing the user specified format onto the adaptive data storage so that when the same user requests a template again, the virtual machine can automatically generate a hydrated template that corresponds to the user specified format.

2. The method according to claim 1, wherein the template is generated based on one or more of the following programming languages: Python, Hypertext Markup Language (HTML), Extensible Markup Language (XML), Cascading Style Sheet (CSS), JavaScript, Flask, Jinja, C, and YAML.

3. The method according to claim 1, wherein the electronic data presentation is a power point slide presentation.

4. The method according to claim 1, wherein the electronic data presentation is generated by utilizing an application suite from which data creation and data visualization set of charts create an auto-generated language schema which is used in any one of the following presentation file extensions: .pdf, .xml, .vsdx, and .pptx.

5. The method according to claim 1, wherein the template is generated as static template depending on the user's preference and a determination of which line of business of an organization the user belongs to.

6. The method according to claim 5, wherein the electronic data presentation is generated by utilizing an application suite that is configured to export a final version of the electronic data presentation with a user specified template or as a predefined standard template for each respective line of business.

7. A system for implementing an automatic data collection and presentation generator module for automatically generating an electronic data presentation, the system comprising:

a repository that stores a plurality of templates and data components;

a receiver that receives a request from a user to automatically generate an electronic data presentation based on a template and a limited data set selected from the data components, the template having a specified format corresponding to a user's preference or a predefined standard format, and a data size of the limited data set being smaller than a data size of the data components; and a processor coupled to the database and the receiver via a communication network, wherein the processor is configured to:

receive user's credential information corresponding to the received request;

verify authentication of the user based on the received user's credential information;

access the database to identify a template among a plurality of templates that corresponds to the specified format requested by the user or the predefined standard format based on user's access permission and the verified authentication;

hydrate the identified template with the limited data by applying a predefined data injection algorithm that is configured to determine that the limited data set is accessible by the user based on the user's access permission and the verified authentication;

automatically generate the electronic data presentation with the hydrated identified template having the limited data; and display the generated electronic data presentation onto a graphical user interface (GUI), wherein the database is an adaptive data storage and wherein, in order to hydrate the identified template, the processor is configured to trigger the following predefined data injection algorithm;

call the requested template from the adaptive data storage;

identify whether the requested template includes user specified format that are currently not available among the plurality of formats;

trigger a virtual machine to machine learn the user specified formats;

correlate the user specified format to a particular user who requested the template; and store the user specified format onto the adaptive data storage so that when the same user requests a template again, the virtual machine can automatically generate a hydrated template that corresponds to the user specified format.

8. The system according to claim 7, wherein the processor generates the template based on one or more of the following programming languages: Python, Hypertext Markup Language (HTML), Extensible Markup Language (XML), Cascading Style Sheet (CSS), JavaScript, Flask, Jinja, C, and YAML.

9. The system according to claim 7, wherein the electronic data presentation is a power point slide presentation.

10. The system according to claim 7, wherein the processor generates the electronic data presentation by utilizing an application suite from which data creation and data visualization set of charts create an auto-generated language schema which is used in any one of the following presentation file extensions: .pdf, .xml, .vsdx, and .pptx.

11. The system according to claim 7, wherein the processor generates the template as static template depending on the user's preference and a determination of which line of business of an organization the user belongs to.

12. The system according to claim 11, wherein the processor generates the electronic data presentation by utilizing an application suite that is configured to export a final version of the electronic data presentation with a user specified template or as a predefined standard template for each respective line of business.

13. A non-transitory computer readable medium configured to store instructions for implementing an automatic data collection and presentation generator module for automatically generating an electronic data presentation, wherein, when executed, the instructions cause a processor to perform the following:
   providing a database that stores a plurality of templates and data components;
   receiving a request from a user to automatically generate an electronic data presentation based on a template and a limited data set selected from the data components, the template having a specified format corresponding to a user's preference or a predefined standard format, and a data size of the limited data set being smaller than a data size of the data components;
   receiving user's credential information corresponding to the received request;
   verifying authentication of the user based on the received user's credential information;
   accessing the database to identify a template among a plurality of templates that corresponds to the specified format requested by the user or the predefined standard format based on user's access permission and the verified authentication;
   hydrating the identified template with the limited data by applying a predefined data injection algorithm that is configured to determine that the limited data set is accessible by the user based on the user's access permission and the verified authentication;
   automatically generating the electronic data presentation with the hydrated identified template having the limited data; and
   displaying the generated electronic data presentation onto a graphical user interface (GUI),
   wherein the database is an adaptive data storage and wherein, in order to hydrate the identified template, the instructions, when executed, cause the processor to trigger the following predefined data injection algorithm:
   call the requested template from the adaptive data storage;
   identify whether the requested template includes user specified format that are currently not available among the plurality of formats;
   trigger a virtual machine to machine learn the user specified formats;
   correlate the user specified format to a particular user who requested the template; and
   store the user specified format onto the adaptive data storage so that when the same user requests a template again, the virtual machine can automatically generate a hydrated template that corresponds to the user specified format.

14. The non-transitory computer readable medium according to claim 13, wherein the instructions, when executed, cause the processor to generate based on one or more of the following programming languages: Python, Hypertext Markup Language (HTML), Extensible Markup Language (XML), Cascading Style Sheet (CSS), JavaScript, Flask, C, and YAML.

15. The non-transitory computer readable medium according to claim 13, wherein the instructions, when executed, cause the processor to generate the electronic data presentation by utilizing an application suite from which data creation and data visualization set of charts create an auto-generated language schema which is used in any one of the following presentation file extensions: .pdf, .xml, .vsdx, and .pptx.

16. The non-transitory computer readable medium according to claim 13, wherein the instructions, when executed, cause the processor to generate the template as static template depending on the user's preference and a determination of which line of business of an organization the user belongs to.

17. The non-transitory computer readable medium according to claim 16, wherein the instructions, when executed, cause the processor to generate the electronic data presentation by utilizing an application suite that is configured to export a final version of the electronic data presentation with a user specified template or as a predefined standard template for each respective line of business.

* * * * *